Oct. 30, 1962     P. B. BANKS     3,061,752
TELEVISION CAMERA TUBES
Filed June 24, 1959
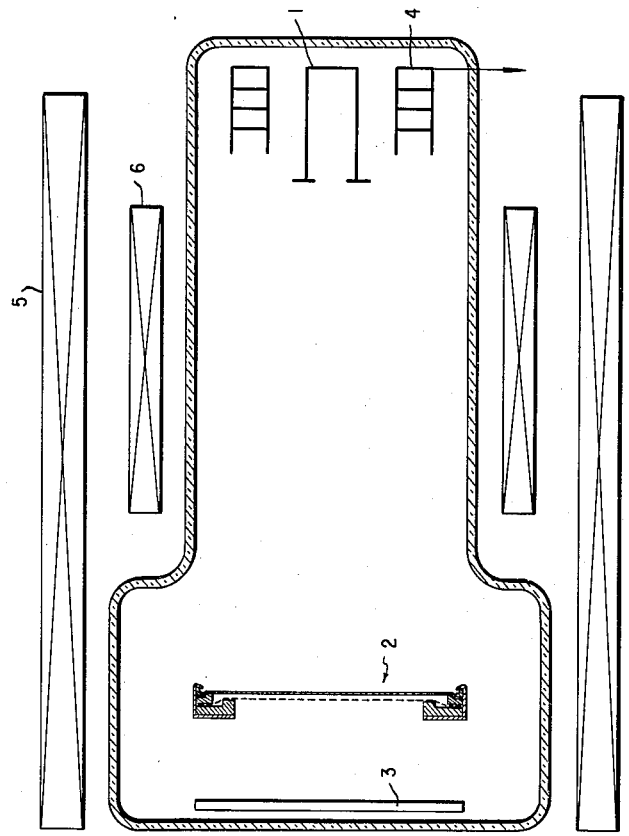
FIG.1
FIG.2
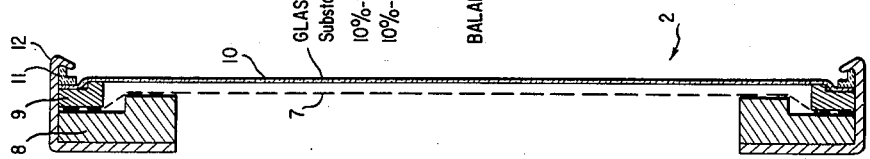
INVENTOR.
Peter Baldwin Banks
BY Baldwin & Wright
ATTORNEYS United States Patent Office 3,061,752
Patented Oct. 30, 1962

3,061,752
TELEVISION CAMERA TUBES
Peter Baldwin Banks, Essex, England, assignor to English Electric Valve Company Limited, London, England, a British company
Filed June 24, 1959, Ser. No. 822,408
Claims priority, application Great Britain July 28, 1958
8 Claims. (Cl. 313—65)

This invention relates to television camera tubes and more specifically to such tubes of the kind including a photo cathode and an electric charge storing target structure comprising an electric resistive glass member on which electric charges representative of the light and shade of different parts of a picture are stored and picked off by a scanning electron beam. The resistivity of the glass is required to be such that stored charges will leak away in about a television frame period. An example of a camera tube of this kind is the well known image orthicon tube. Such tubes are commonly fitted with caesium cathodes or with tri-alkali photo cathodes.

A defect commonly experienced with image orthicon and similar tubes is that known as "sticking." It is particularly manifest when the photo cathode is a tri-alkali photo cathode though it also occurs in other cases, e.g. when the photo cathode is a caesium cathode. "Sticking" is caused by the retention by the target structure of charges beyond the period in which they should leak away and is a by-product of excessively high resistivity of the glass. Its effect is that if the camera tube is switched round from one scene to another there is a short period occurring at the beginning of the televising of the second scene during which the camera gives picture signals appropriate to the first scene, these picture signals being due to the "sticking" of the charges representative of the first scene on the target structure.

An explanation, which is believed to be correct, will now be given of why "sticking" occurs in known tubes of the kind referred to, especially, though by no means exclusively in image orthicon tubes with tri-alkali cathodes. Although the explanation now to be given is believed to be correct, the utility of the invention is not dependent upon the correctness and sufficiency or otherwise of the theory to be advanced.

It is believed that "sticking" manifests itself with known image orthicon and like tubes, and especially those having tri-alkali photo cathodes, because of the raising of the glass resistivity as a result of attack on the glass of the target structure by vapour (sodium vapour in the case of a tri-alkali photo-cathode) which is liberated during activation of the photo cathode in manufacture of the tube. The glasses at present commonly employed for such target structures use $SiO_2$ as the network forming oxide component. This material is subject to attack by alkali metals and especially by sodium. Glass is, of course, porous on the atomic scale and, during activation of the photo cathode in manufacture of the tube, the sodium vapour liberated (in the case of a tri-alkali cathode) penetrates to an appreciable distance into the glass by reason of its porosity and attacks the $SiO_2$ substantially increasing the electrical resistance of the glass above the desired intended value. A similar but rather less marked action is produced by potassium and caesium vapours.

A typical known glass composition as at present employed for the targets of image orthicon and like tubes is as follows:

| | Percent |
|---|---|
| $Na_2O$ | 17 |
| $CaO$ | 5 |
| $MgO$ | 4 |
| $Al_2O_3$ | 2 |
| $SiO_2$ | 72 |

When this glass is used for the target structure of a known tube of the kind referred to, especially in the case of one having tri-alkali photo cathode, considerable "sticking" is commonly experienced.

According to this invention glass which is resistant to attack by alkali metals and is suitable for use as for the electrical charge storing target of a television camera tube is substantially composed of boric oxide and from 10% to 20% by weight of lithium oxide and between 10% and 40% by weight of other oxides.

Preferably said other oxides are oxides of one or more of the elements magnesium, calcium, zinc and aluminium.

The presence of the component lithium oxide aids in keeping up electrical conductivity while maintaining the thermal expansion low.

A glass in accordance with this invention is very suitable for use as the thin glass, electrical charge storing target of an image orthicon television camera tube. Depending on the exact composition a glass in accordance with this invention has an electrical resistivity between about $10^{11}$ ohms/cm.$^3$ and about $10^{12}$ ohms/cm.$^3$ at 25° C.

One form of glass for use in carrying out the invention is composed of about ⅔ $B_2O_3$, about ⅙ $LiO_2$ and about ⅙ $Al_2O_3$ all by weight. An actual composition which has been successfully used is:

| | Percent by weight |
|---|---|
| $Li_2O$ | 14.7 |
| $Al_2O_3$ | 16.7 |
| $B_2O_3$ | 68.6 |

The temperature of melt of this glass is about 950° C. and its resistivity is from about 1 to $3 \times 10^{11}$ ohms per cm.$^3$. This glass is, however, rather fragile and a rather improved glass is obtained by adding CaO to the mixture, using about ⅔ $B_2O_3$, about ⅛ each of $Li_2O$ and CaO, and the remainder $Al_2O_3$. An actual composition successfully used was:

| | Percent by weight |
|---|---|
| $Li_2O$ | 13.44 |
| $CaO$ | 14.97 |
| $Al_2O_3$ | 7.57 |
| $B_2O_3$ | 64.02 |

A glass target structure in accordance with this invention will, like a known glass target structure, usually be a glass disc mounted in a metal mounting ring by glazing the same and sealing the glass disc into it. A suitable glazing material is composed of PbO 72.3%, $B_2O_3$ 25.9% and $SiO_2$ 1.8% all by weight. Sealing may be accomplished satisfactorily at a temperature of about 690° C. Because of the risk of attack by sodium on the glaze, it is advisable that activation of the photo cathode be effected as rapidly as practicable.

FIGURE 1 is a schematic showing of an image orthicon camera tube; and

FIGURE 2 is an enlarged scale detailed sectional view of a storing target, more generally indicated in FIGURE 1, and being in accordance with the invention.

FIGURE 1 shows schematically an image orthicon camera tube having a target structure according to the invention. The representative camera tube comprises an electron gun 1, a glass target structure generally designated 2 of a composition in accordance with the invention, a photo cathode 3, electron multiplier 4, axial focusing coil 5, and forward deflecting coil 6.

The target structure is shown more particularly in FIGURE 2 as comprising a fine wire mesh 7, support ring 8, spacer 9, glass target 10 having a composition according to the invention, sealing ring 11 and clamping ring 12.

It is believed that targets in accordance with this invention not only have greater immunity to "sticking" than the usual known targets, but are of longer life.

I claim:

1. A television tube storing target comprising glass material, resistant to attack by alkali metals and of from 10% to 20% by weight of lithium oxide, from 10% to 40% of additional oxides other than boric oxide, and the balance of boric oxide, said material being substantially free of silica.

2. A glass material, resistant to attack by alkali metals and suitable for use for the electrical charge storing target of a television camera tube, said material being substantially composed of from 10% to 20% by weight of lithium oxide; from 10% to 40% of additional oxide of the group consisting of oxides of the elements magnesium, calcium, zinc and aluminium; and the balance of boric oxide, said material being substantially free of silica as claimed in claim 1 wherein said other oxides are oxides of one or more of the elements magnesium, calcium, zinc and aluminium.

3. A glass material as claimed in claim 2 and composed of about ⅔ $B_2O_3$, about ⅙ $Li_2O$ and about ⅙ $Al_2O_3$ all by weight.

4. A glass material as claimed in claim 3 and substantially composed of 14.7% $Li_2O$; 16.7% $Al_2O_3$; and 68.6% $B_2O_3$; all by weight.

5. A glass material as claimed in claim 2 and composed of about ⅔ $B_2O_3$, and ⅛ each of $Li_2O$ and CaO, and the remainder $Al_2O_3$ all by weight.

6. A glass material as claimed in claim 5 and substantially composed of 13.4% $Li_2O$; 15% CaO; 7.6% $Al_2O_3$; and 64% $B_2O_3$; all by weight.

7. A television camera tube having an electrical charge storing target in the form of a thin membrane of glass material as claimed in claim 1.

8. A camera tube as claimed in claim 7 wherein the membrane is sealed into a glazed mounting frame glazed by a material substantially composed of PbO 72.3%, $B_2O_3$ 25.9% and $SiO_2$ 1.8% all by weight.

References Cited in the file of this patent

UNITED STATES PATENTS

| | | |
|---|---|---|
| 2,606,841 | Armistead | Aug. 12, 1952 |
| 2,747,105 | Fitzgerald et al. | May 22, 1956 |
| 2,946,694 | Labino | July 26, 1960 |